US008322474B2

(12) United States Patent
Uchiyama

(10) Patent No.: US 8,322,474 B2
(45) Date of Patent: Dec. 4, 2012

(54) VEHICLE PROPULSION DEVICE

(75) Inventor: Naoki Uchiyama, Hamamatsu (JP)

(73) Assignee: Kabushiki Kaisha Atsumitec, Shizuoka (JP)

( * ) Notice: Subject to any disclaimer, the term of this patent is extended or adjusted under 35 U.S.C. 154(b) by 410 days.

(21) Appl. No.: 12/668,614

(22) PCT Filed: Jul. 4, 2008

(86) PCT No.: PCT/JP2008/062207
§ 371 (c)(1),
(2), (4) Date: Jan. 11, 2010

(87) PCT Pub. No.: WO2009/008379
PCT Pub. Date: Jan. 15, 2009

(65) Prior Publication Data
US 2010/0190603 A1    Jul. 29, 2010

(30) Foreign Application Priority Data

Jul. 10, 2007    (JP) .................................. 2007-180868

(51) Int. Cl.
*B60W 20/00*    (2006.01)
(52) U.S. Cl. .................... 180/65.31; 180/65.21; 903/906
(58) Field of Classification Search ............... 180/65.26, 180/65.285, 65.29, 65.31, 65.21, 65.275, 180/65.27, 65.28
See application file for complete search history.

(56) References Cited

U.S. PATENT DOCUMENTS
2005/0099146 A1*   5/2005   Nishikawa et al. ............. 318/63

FOREIGN PATENT DOCUMENTS

| CN | 1441154 | 9/2003 |
|---|---|---|
| JP | 61-147743 | 7/1986 |
| JP | 16-159876 | 10/1986 |
| JP | 159876/1986 | 10/1986 |
| JP | 8-148189 | 6/1996 |
| JP | 9-84302 | 3/1997 |
| JP | 2002-36903 | 2/2002 |
| JP | 2004-236411 | 8/2004 |
| JP | 2005-151633 | 6/2005 |

* cited by examiner

*Primary Examiner* — John Walters
*Assistant Examiner* — James Triggs
(74) *Attorney, Agent, or Firm* — Cozen O'Connor

(57) ABSTRACT

When a drive wheel (3) of a vehicle is driven by a motor generator (10) that operates as a motor, electric power is supplied from a storage battery (20) to the motor generator (10). When the drive wheel (3) is braked by the motor generator (10) that operates as a generator, electric power is supplied from the motor generator (10) to the storage battery (20), and a first thermoelectric conversion element (11) is supplied with electric power from the motor generator (10) to cool the motor generator (10).

7 Claims, 6 Drawing Sheets

VEHICLE PROPULSION DEVICE

RELATED APPLICATIONS

This is a U.S. National Phase Application under 35 USC §371 of International Application PCT/JP2008/062207 filed on Jul. 4, 2008.

This application claims the priority of Japanese Patent Application No. 2007-180868 filed Jul. 10, 2007, the entire content of which is hereby incorporated by reference.

TECHNICAL FIELD

The present invention relates to a vehicle propulsion device in which a motor generator is used as a power source independently or in combination with another power source.

BACKGROUND ART

An electric car is known as a vehicle in which a motor generator is utilized as a power source. When the electric car is moving or when it is accelerating, the electric power stored in a storage battery (hereinafter, occasionally referred to as a "battery") is supplied to the motor generator that works as a motor. When the car is braked, the regenerated electric power obtained by operating the motor generator as a generator is stored in the battery.

A hybrid car is also known as a vehicle in which a motor generator is utilized as a power source. In the hybrid car, the regenerated electric power obtained by operating the motor generator as a generator at the time of braking is stored in the battery. When the car is moving or when it is accelerating, the electric power stored in the battery is supplied to the motor generator that works as a motor, and an internal combustion engine serving as another power source is assisted by the driving force created by the motor generator, so that fuel consumption is improved. Such a hybrid car is disclosed, for example, in Unexamined Japanese Patent Publication No. 2005-151633.

However, for example, if regenerative braking is used on an electric or hybrid car (hereinafter, occasionally referred to as "electric car or the like") for a prolonged time or with frequency on a downhill or the like, there is the possibility of a battery overcharge. It is then necessary to switch the regenerative braking to mechanical brake or use the both, and accordingly, the kinetic energy that is essentially recoverable as regenerative energy is lost because of the mechanical brake. It is therefore difficult to say that the kinetic energy generated during vehicle deceleration can be fully recovered.

In a situation where an overcharge occurs, a rise in battery temperature increases electric resistance (hereinafter, occasionally referred to as "resistance") of electrodes or the like in the battery, and thereby power loss in the battery is increased. In addition, the heavy usage of the mechanical brake quickly wears a brake shoe and the like.

One way to solve these issues is to increase the charging capacity of the battery. On the other hand, if a lot of batteries are installed in an electric car or the like, there causes problems, such as a reduction in a passenger's space in the vehicle and an increase in weight of the vehicle body. When the vehicle is a hybrid car, the concurrent use of an engine brake is possible. However, as seen in the case where a mechanical brake is concurrently used, there still remains the problem that the kinetic energy generated during vehicle deceleration cannot be fully recovered.

DISCLOSURE OF THE INVENTION

The present invention has been made in light of the foregoing issues. It is an object of the invention to provide a vehicle propulsion device that is capable of properly charging a storage battery and suppressing energy loss.

In order to achieve the object, the vehicle propulsion device of the invention comprises a motor generator that is installed in a vehicle and is capable of driving a drive wheel of the vehicle by working as a motor and braking the drive wheel of the vehicle by working as a generator; a storage battery that transfers electric power to and from the motor generator; a first thermoelectric conversion element that is thermally connected to the motor generator; and a power control unit that controls the power transfer between the motor generator and the storage battery so that the electric power is supplied from the storage battery to the motor generator when the motor generator drives the drive wheel, and, on the other hand, controls the power transfer between the motor generator and the storage battery so that the electric power is supplied from the motor generator to the storage battery, and simultaneously controls, a power supply from the motor generator to the first thermoelectric conversion element so that the first thermoelectric conversion element is supplied with electric power from the motor generator to cool the motor generator, when the motor generator brakes the drive wheel.

According to the vehicle propulsion device thus constructed, when the drive wheel of the vehicle is braked by the motor generator, the storage battery is charged by being supplied with regenerated electric power of the motor generator. At the same time, the first thermoelectric conversion element is supplied with the regenerated electric power of the motor generator to cool the motor generator.

Consequently, unlike a case where all the regenerated electric power of the motor generator is used to charge the storage battery, the possibility of overcharge of the storage battery is lowered. It is thus possible to improve the durability of the storage battery and prevent an increase in power loss attributable to a temperature rise of the storage battery, which is caused by overcharge. Simultaneous usage of a mechanical brake at the time of braking lowers the possibility of overcharge, and therefore, a dependence upon the mechanical brake is lessened. As a result, the durability of the mechanical brake is improved as well. Moreover, the motor generator is cooled by using a portion of the regenerated electric power of the motor generator, so that copper and iron losses in the motor generator are decreased, and electric power consumption of the vehicle is reduced. If the vehicle is a hybrid vehicle, such a decrease in electric power consumption improves fuel consumption.

For instance, the power control unit may implement such control that the first thermoelectric conversion element converts thermal energy generated by the motor generator into electric power and supplies the electric power to the storage battery or the motor generator when the first thermoelectric conversion element is not in the process of cooling the motor generator.

In this situation, a portion of the thermal energy generated by the motor generator is recovered as electric power when the first thermoelectric conversion element is not in the process of cooling the motor generator, thereby reducing a discharge rate of the storage battery. As a result, energy-use efficiency is enhanced, and the durability of the storage battery is improved. Furthermore, since the thermal energy of the motor generator is converted into electric power, the temperature rise of the motor generator is diminished, and the increase of the copper and iron losses of the motor generator is alleviated. As a consequence, if the vehicle is a hybrid vehicle using an internal combustion engine as another power source, fuel consumption can further be improved as a result of the decrease of discharge rate of the storage battery and the diminishment of temperature rise of the motor generator.

The vehicle propulsion device may further comprise, for example, a second thermoelectric conversion element that is thermally connected to the storage battery. In this case, when the motor generator drives the drive wheel, the power control unit may implement such control that the second thermoelectric conversion element converts the thermal energy of the storage battery into electric power and supplies the electric power to the motor generator. When the motor generator brakes the drive wheel, the power control unit may implement such control that the second thermoelectric conversion element converts the thermal energy of the storage battery into electric power and charges the storage battery.

If the power control unit implements the control described above, the thermal energy of the storage battery is recovered. Consequently, the discharge rate of the storage battery is further decreased, and the temperature rise of the storage battery is diminished. The energy-use efficiency and the durability of the storage battery are then further improved. If the vehicle is a hybrid vehicle, fuel consumption is further improved by the decrease of discharge rate of the storage battery.

The vehicle propulsion device may further comprise, for example, a storage rate sensor that detects the quantity of electricity stored in the storage battery. The power control unit of this propulsion device may implement such control that, when the motor generator brakes the drive wheel and electric power is supplied from the motor generator to the storage battery, the power supply from the motor generator to the first thermoelectric conversion element is stopped if the quantity of electricity, which has been detected by the storage rate sensor, is less than predetermined quantity of electricity. On the other hand, the power control unit may implement such control that, when the motor generator brakes the drive wheel and electric power is supplied from the motor generator to the storage battery, the first thermoelectric conversion element is supplied with electric power from the motor generator to cool the motor generator if the quantity of electricity, which has been detected by the storage rate sensor, is equal to or more than the predetermined quantity of electricity.

When the power control unit implements the control described above, if the quantity of electricity stored in the storage battery is less than the predetermined quantity of electricity, the regenerated electric power of the motor generator is not supplied to the first thermoelectric conversion element but supplied to and charged to the storage battery, so that the storage battery is quickly charged. If the quantity of electricity stored in the storage battery is equal to or more than the predetermined quantity of electricity, the first thermoelectric conversion element is supplied with a portion of the regenerated electric power of the motor generator, and cools the motor generator. This decreases the copper and iron losses of the motor generator, and reduces the electric power consumption of the vehicle. In this case, the charging current of the storage battery is reduced by supplying a portion of the regenerated electric power of the motor generator to the first thermoelectric conversion element. Accordingly, if the predetermined quantity of electricity is set at a quantity of electricity, which is less than a rated storage capacity of the storage battery, it is possible to lower the possibility of overcharge of the storage battery without fail, and thus to improve the durability of the storage battery.

In a case where the vehicle propulsion device further comprises the storage rate sensor that detects the quantity of electricity stored in the storage battery as described above, if the quantity of electricity, which has been detected by the storage rate sensor, is less than the predetermined quantity of electricity when electric power is supplied from the motor generator that brakes the drive wheel to the storage battery, the power control unit may implement such control that the first thermoelectric conversion element converts the thermal energy generated by the motor generator into electric power to charge the storage battery.

In this situation, the storage battery can be more quickly charged since the thermal energy generated by the motor generator is recovered as electric power by using the first thermoelectric conversion element, and then the storage battery is charged by being supplied with the electric power. Furthermore, the temperature rise of the motor generator is diminished by converting the thermal energy of the motor generator into electric power, so that the increase of the copper and iron losses of the motor generator is further alleviated. As a consequence, if the vehicle is a hybrid vehicle, fuel consumption is further improved due to the decrease of discharge rate of the storage battery and the diminishment of temperature rise of the motor generator.

The vehicle propulsion device may further comprise, for example, a battery temperature sensor that detects the temperature of the storage battery. The power control unit of this propulsion device may implement such control that, when the motor generator brakes the drive wheel, and the temperature of the storage battery, which has been detected by the battery temperature sensor, is equal to or higher than predetermined temperature, the second thermoelectric conversion element is supplied with electric power from the motor generator to cool the storage battery. If the storage battery is cooled in this manner, increase of an internal electrode resistance of the storage battery is restrained, so that the power loss of the storage battery is reduced, and the durability of the storage battery is improved. Consequently, if the vehicle is a hybrid vehicle, fuel consumption is further improved due to the reduction of power loss of the storage battery.

BEST MODE OF CARRYING OUT THE INVENTION

A vehicle propulsion device according to each embodiment of the present invention will be described below with reference to the drawings.

Figure 1:
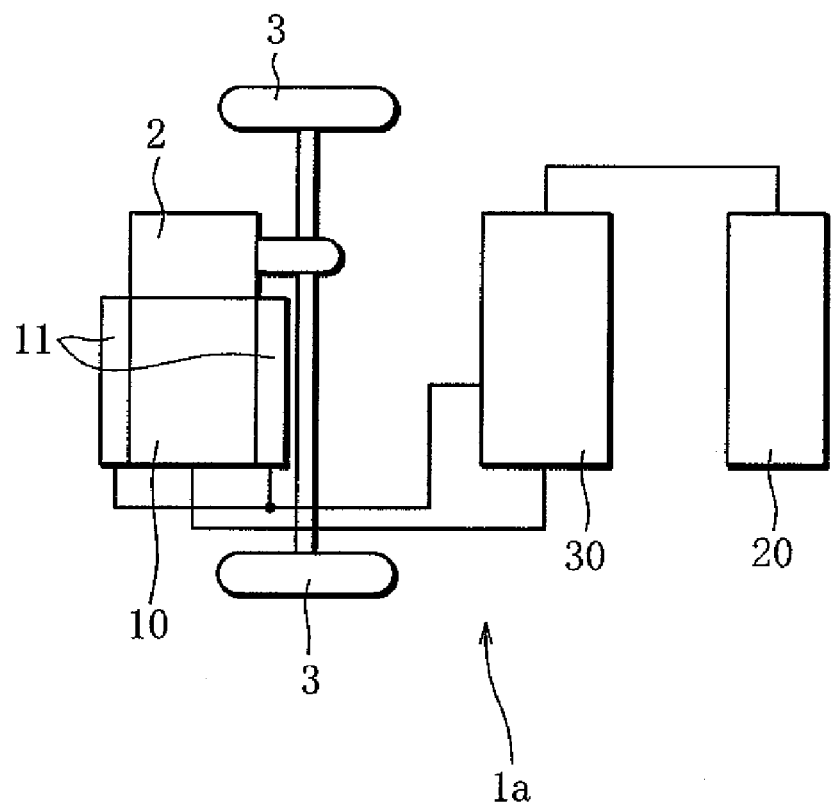
FIG. 1 is a schematic configuration view showing a propulsion device according to a first embodiment of the present invention.
Figure 2:
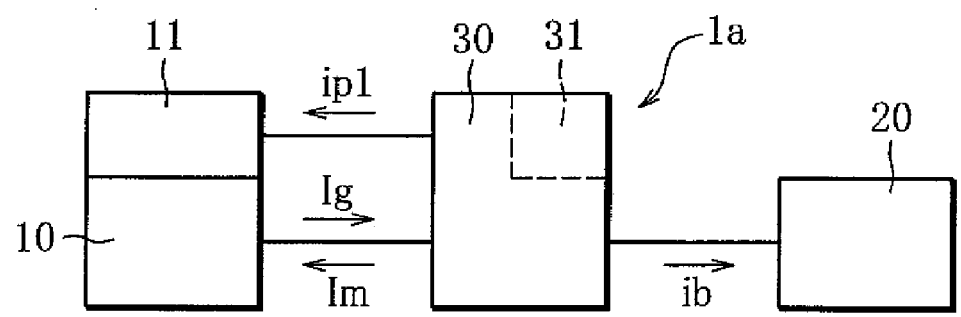
FIG. 2 is a block diagram for explaining the operation of the propulsion device shown in FIG. 1.
Figure 3:
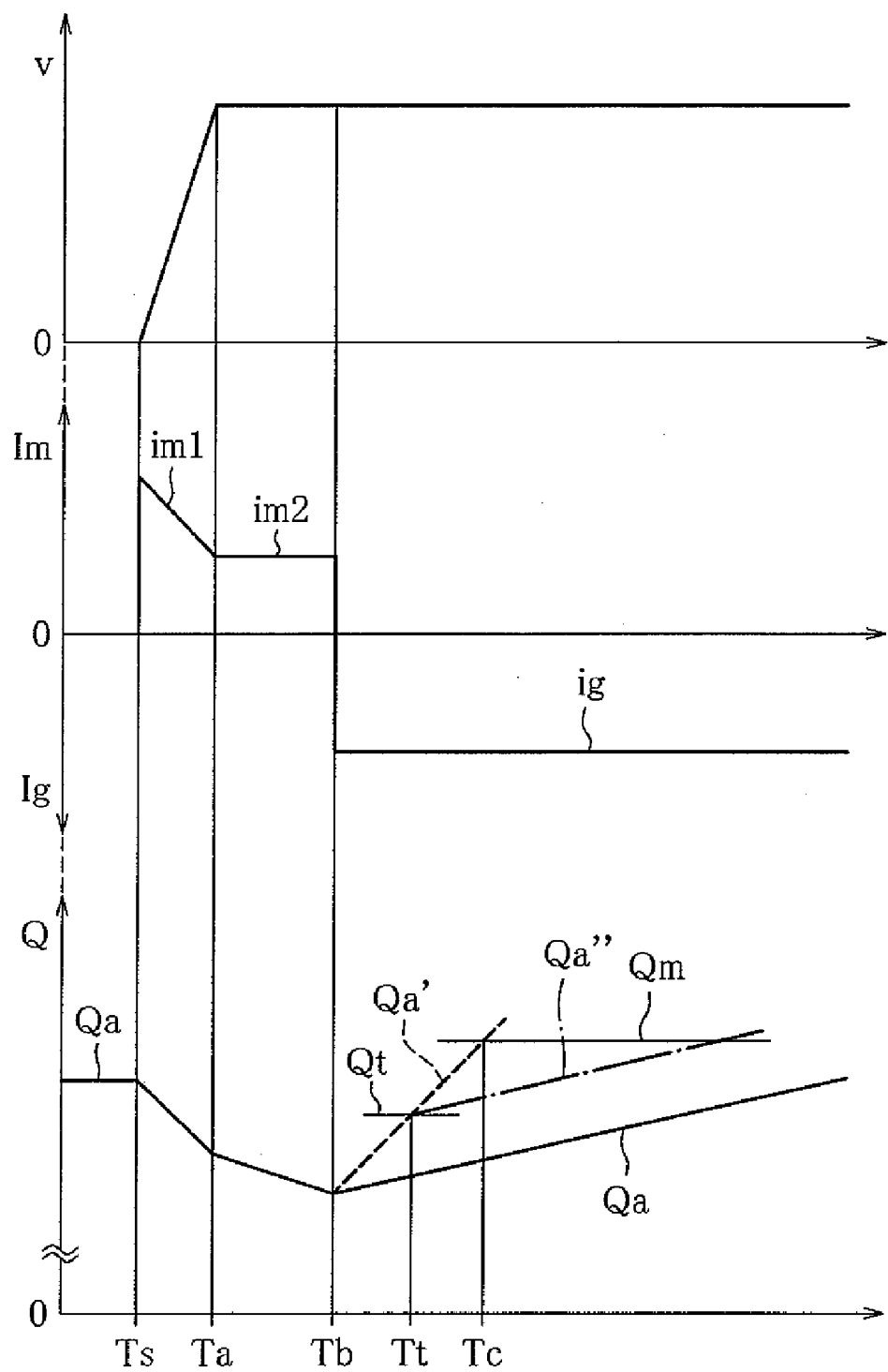
FIG. 3 is a graph showing temporal changes in vehicle speed, motor generator current, and quantity of electricity stored in a battery, when the propulsion device shown in FIG. 1 is in operation.

A vehicle propulsion device 1a according to a first embodiment of the invention will be described below with reference to FIGS. 1 to 3. FIG. 1 is a schematic configuration view showing the propulsion device 1a. FIG. 2 is a block diagram for explaining the operation of the propulsion device 1a. FIG. 3 is a graph showing temporal changes in vehicle speed v, motor generator current, and quantity of electricity Q stored in a battery, when the propulsion device 1a is in operation.

The propulsion device 1a has a motor generator 10, a first thermoelectric conversion element 11 that is thermally connected to the motor generator 10, a battery 20, and a power control unit 30 (hereinafter, referred to as "PCU 30"). The PCU 30 detects an operation condition of a vehicle, and controls the sending and receiving of electric current (or electric power) of the motor generator 10, the first thermoelectric conversion element 11 and the battery 20. A transmission 2 is coupled to an output shaft of the motor generator 10. A differential gear installed on an output side of the transmission 2 drives drive wheels 3 through axles.

The operation of the motor generator 10 and the charge/discharge of the battery 20 in the propulsion device 1a will be described below with reference to FIGS. 2 and 3. In FIGS. 2 and 3, the electric current of the motor generator 10 is denoted by motor drive current Im in a plus region and by regenerated current Ig in a minus region. FIG. 2 shows current supply directions indicated by arrows. In FIG. 3, the electric current that flows out of the PCU 30 is positive current, and the electric current that flows into the PCU 30 is negative current.

As illustrated in FIG. 2, the propulsion device 1a supplies the motor drive current Im from the battery 20 to the motor generator 10 at the time of driving the vehicle, and operates the motor generator 10 as a motor, so that a drive force is transmitted to the drive wheels 3 to thereby drive the vehicle. The propulsion device 1a is so constructed as to operate the motor generator 10 as a generator to brake the drive wheels 3 at the time of braking the vehicle, and to supply the regenerated current Ig to the battery 20 and the first thermoelectric conversion element 11 serving as a Peltier element.

FIG. 3 shows temporal changes in electric current of the motor generator 10 and quantity of electricity Q stored in the battery 20 when the vehicle is accelerated from time Ts to time Ta, travels on a level ground at constant speed from time Ta to time Tb, and then travels on a downward slope at constant speed from time Tb while being braked, as shown by the vehicle speed v.

As shown in FIG. 3, in the accelerated condition from time Ts to time Ta, the battery 20 supplies the motor generator 10 with electric current im1 as the motor drive current Im. In the constant-speed traveling condition from time Ta to time Tb, the battery 20 supplies the motor generator 10 with electric current im2 (im1>im2) as the motor drive current Im. During a period between time Ts and time Tb, namely, during the driving of the vehicle, the quantity of electricity Q stored in the battery 20 continues to decrease. However, since the electric current im1 is higher than the electric current im2, the decrease of the quantity of electricity Q in the battery 20 slows down after time Ta, as compared to the decrease before time Ta.

In the braking condition on and after time Tb, the electric current ig is supplied as the regenerated current Ig from the motor generator 10 to the battery 20 and the first thermoelectric conversion element 11. At this time, the battery 20 is charged by being supplied with charging current ib. Simultaneously, the first thermoelectric conversion element 11 is supplied with drive current ip1 and cools the motor generator 10. The cooling of the motor generator 10 reduces the copper and iron losses in the motor generator 10, thereby decreasing power loss, and improves the durability of the motor generator 10.

If the electric current ip1 is not supplied to the first thermoelectric conversion element 11 at the time of braking on and after time Tb, the battery 20 is charged with the electric current ig (ig=ib+ip1). In this case, as shown by a broken line Qa' in FIG. 3, the charging speed of the battery 20 is increased, and a rated storage capacity Qm is reached at time Tc. On this account, if the charging is continued on and after time Tc, the battery 20 is overcharged.

However, since the propulsion device 1a of the present embodiment supplies the first thermoelectric conversion element 11 with the electric current ip1, which is a portion of the electric current ig supplied from the motor generator 10, as described above, the battery 20 is charged with the electric current ib (ib=ig−ip1) that is lower than the electric current ig as shown in FIG. 3. The quantity of electricity Q of the battery 20 is accordingly changed as shown by line Qa in FIG. 3, and it takes longer before the battery 20 is overcharged. That is to say, there is a higher chance that the vehicle finishes travelling on the entire downward slope before the battery 20 is overcharged. In this way, the propulsion device 1a lowers the possibility of overcharge of the battery 20.

If the PCU 30 includes a storage rate sensor 31 as illustrated in FIG. 2, the PCU 30 is capable of achieving a quick charge of the battery 20 and, at the same time, lowering the possibility of overcharge. To put it differently, the PCU 30 changes a charging condition of the battery 20 at the time of braking according to the quantity of electricity of the battery 20, which has been detected by the storage rate sensor 31.

More specifically, when the quantity of electricity Q of the battery 20 is less than a predetermined quantity of electricity Qt that is set at a smaller value than the rated storage capacity Qm of the battery 20, the PCU 30 charges the battery 20 with the electric current ig (ig=ib+ip1) without supplying the electric current ip1 to the first thermoelectric conversion element 11. The battery 20 is thus quickly charged on and after time Tb as shown in the broken line Qa' in FIG. 3. When the quantity of electricity Q of the battery 20 reaches the predetermined quantity of electricity Qt at time Tt, the PCU 30 starts supplying the electric current ip1 to the first thermoelectric conversion element 11 and reduces the charging current of the battery 20 from the electric current ig to the electric current ib. In result, as shown by a dashed line Qa" in FIG. 3, the charging of the battery 20 becomes slower than that before time Tt. The propulsion device 1a having the storage rate sensor 31 thus achieves a quick charging of the battery 20, and simultaneously lowers the possibility of overcharge of the battery 20. The storage rate sensor 31 may be, for example, a sensor that estimates the quantity of electricity Q stored in the battery 20 from output voltage of the battery 20.

As described above, the propulsion device 1a of the present embodiment is able to reduce the power loss by cooling the motor generator 10. Since the protrusion device 1a lowers the possibility of overcharge of the battery 2, dependence upon a mechanical brake is lessened, and the durability of the battery 20 is improved. The improvement of durability of the battery 20 multiplies the total energy that can be recovered by the battery 20, and thus increases the usable energy of the battery 20, thereby reducing cost required for securing energy. Needless to say, if the propulsion device 1a has the storage rate sensor 31 as described above, it is possible to achieve the quick charging of the battery 20 and, at the same time, lower the possibility of an overcharge.

When the vehicle is a hybrid vehicle having an internal combustion engine, not shown, as another power source, fuel consumption is improved because of a reduction in power loss, which is caused by the cooling of the motor generator 10, and an increase in recovered energy, which results from the improvement of durability of the battery 20.

Figure 4:
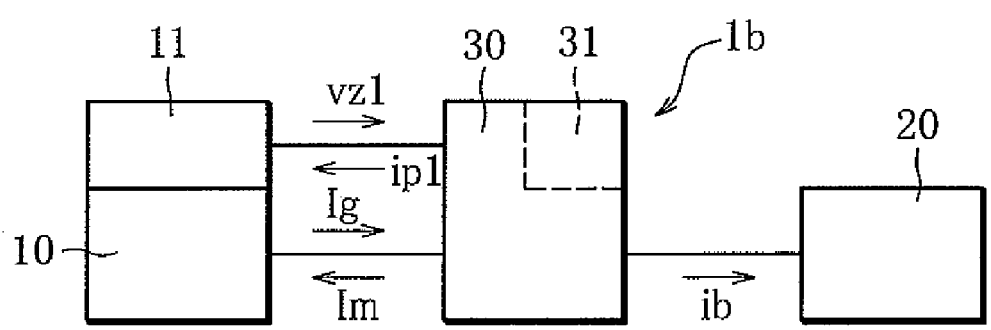
FIG. 4 is a block diagram for explaining the operation of a propulsion device according to a second embodiment of the present invention.
Figure 5:
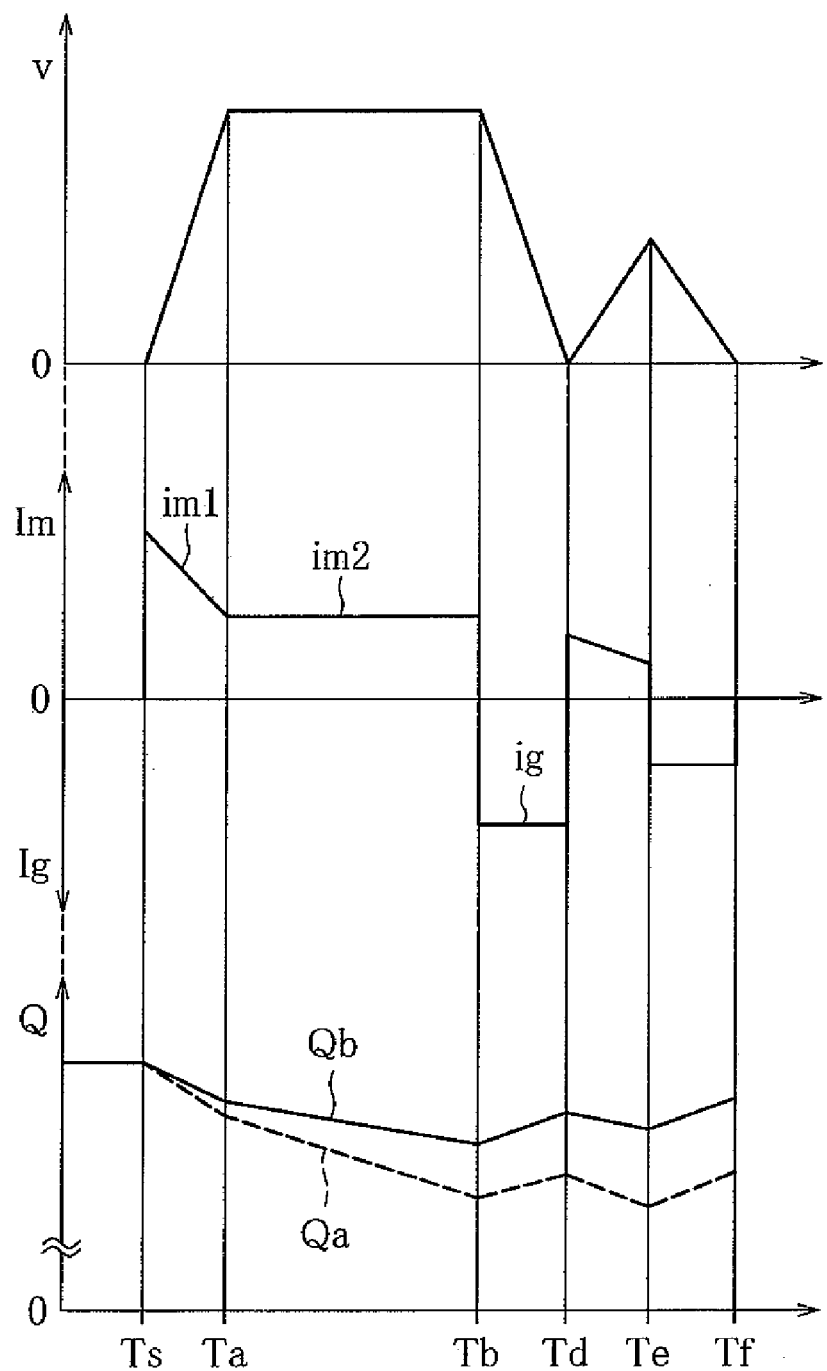
FIG. 5 is a graph showing temporal changes in vehicle speed, motor generator current, and quantity of electricity stored in a battery, when the propulsion device shown in FIG. 4 is in operation.

A vehicle propulsion device 1b according to a second embodiment of the present invention will be described below with reference to FIGS. 4 to 5. Components having the same functions as those of the first embodiment will be provided with the same reference marks, and the explanation thereof will be omitted. FIG. 4 is a block diagram for explaining the operation of a propulsion device 1b. FIG. 5 is a graph showing temporal changes in vehicle speed v, electric current of a motor generator 10, and quantity of electricity Q stored in a battery 20, when the propulsion device 1b is in operation.

The temporal change of the quantity of electricity Q in FIG. 5 is shown in comparison with that of the above-described first embodiment. In FIGS. 4 and 5, the electric current of the motor generator 10 is denoted by motor drive current Im in a plus region and by regenerated current Ig in a minus region. FIG. 4 shows current supply directions indicated by arrows. In FIG. 5, the electric current that flows out of a PCU 30 is positive current, whereas the electric current that flows into the PCU 30 is negative current.

The propulsion device 1b of the second embodiment is different from the propulsion device 1a of the first embodiment in that a first thermoelectric conversion element 11 of the second embodiment not only cools the motor generator 10 as a Peltier element but also functions as a thermoelectric generation element as a result of Seebeck effect by being controlled by the PCU 30, and is thus capable of converting the thermal energy of the motor generator 10 into electric power. In short, with the propulsion device 1b, a portion of the electric power lost by copper and iron losses in the motor generator 10 can be recovered. According to the present embodiment, the PCU 30 has a voltage converter (not shown) that converts output voltage (shown by vz1 in FIG. 4) of the first thermoelectric conversion element 11 into predetermined voltage.

FIG. 5 shows temporal changes in the electric current of the motor generator 10 and the quantity of electricity Q stored in the battery 20 when the vehicle is accelerated from time Ts to time Ta, travels at constant speed from time Ta to time Tb, is decelerated from time Tb and stopped at time Td, is accelerated from time Td to time Te, and is then decelerated from time Te to time Tf and stopped at time Tf, as shown by vehicle speed v.

As shown in FIG. 5, in the propulsion device 1b, the battery 20 supplies the motor generator 10 with electric current im1 as motor drive current Im during a time period between time Ts and time Tb (driving period) in the same manner as in the propulsion device 1a of the first embodiment. In a constant-speed traveling condition from time Ta to time Tb, the battery 20 supplies the motor generator 10 with electric current im2 (im1>im2) as the motor drive current Im. In result, the quantity of electricity Q of the battery 20 is decreased as shown by a solid line Qb. The propulsion device 1b, however, is able to convert the thermal energy of the motor generator 10 into electric power by using the first thermoelectric conversion element 11 and supply the electric power to the motor generator 10. Consequently, comparing the propulsion device 1a in which the quantity of electricity Q of the battery 20 is decreased as shown by a broken line Qa in FIG. 5, the propulsion device 1b lessens a discharge rate of the battery 20 during driving. Since the electric power of the battery 20 is supplied to the motor generator 10, it can be also considered that the electric power obtained by converting the thermal energy is supplied to the battery 20.

During a time period between time Tb when the vehicle is decelerated and time Td when the vehicle is stopped (braking period), the motor generator 10 performs regenerative braking and thus generates electric current ig as regenerated current Ig. In this period, similarly to the propulsion device 1a, the propulsion device 1b supplies drive current ip1 to the first thermoelectric conversion element 11 to operate the first thermoelectric conversion element 11 as a Peltier element. By so doing, the first thermoelectric conversion element 11 cools the motor generator 10, and the battery 20 is charged by being supplied with current ib. It can be therefore said that a fluctuation in quantity of electricity Qb of the battery 20 of the propulsion device 1b is identical to a fluctuation in quantity of electricity Qa of the propulsion device 1a. Consequently, the battery 20 of the propulsion device 1b, which discharges at a lower rate than the battery 20 of the propulsion device 1a at time Tb, is capable of maintaining a higher quantity of electricity during braking, as compared to the battery 20 of the propulsion device 1a.

In a time period between time Td and time Te (driving period), the propulsion device 1b is able to convert the thermal energy of the motor generator 10 into electric power in the above-mentioned manner. As in the time period between time Ts and time Tb, the battery 20 of the propulsion device 1b discharges at a lower rate than the battery 20 of the propulsion device 1a.

During a time period from the point at which the vehicle is decelerated at time Te to the point at which the vehicle is stopped at Tf (baking period), as seen in the time period between time Tb and time Td, a fluctuation in the quantity of electricity Qb of the battery 20 of the propulsion device 1b is identical to a fluctuation in the quantity of electricity Qa of the battery 20 of the propulsion device 1a.

The propulsion device 1b of the present embodiment further reduces the discharge rate of the battery 20, as compared to the propulsion device 1a. The propulsion device 1b therefore improves energy-use efficiency and reduces the cost required for securing energy more than the propulsion device 1a. When the vehicle is a hybrid vehicle having an internal combustion engine, not shown, as another power source, fuel consumption is improved.

The PCU 30 of the propulsion device 1b may further have a storage rate sensor 31. In this case, during braking, if the quantity of electricity Q of the battery 20, which has been detected by the storage rate sensor 31, is less than predetermined quantity of electricity Qt, the PCU 30 does not supply electric current ip1 to the first thermoelectric conversion element 11, and the battery 20 is charged with the electric current ig When the quantity of electricity Q of the battery 20 reaches the predetermined quantity of electricity Qt, the PCU 30 supplies the electric current ip1 to the first thermoelectric conversion element 11 and reduces the charging current of the battery 20 from the electric current ig to the electric current ib. During braking, therefore, the battery 20 can be quickly charged if the quantity of electricity Q of the battery 20 is small. When the quantity of electricity Q of the battery 20 reaches the predetermined quantity of electricity Qt, the battery 20 is slowly charged with the electric current ib that is lower than the electric current ig, thereby lowering the possibility of overcharge.

In the propulsion device 1b of the present embodiment, during driving, the first thermoelectric conversion element 11 converts the thermal energy of the motor generator 10 into electric power and supplies the electric power to the motor generator 10. During braking, the first thermoelectric conversion element 11 cools the motor generator 10. As long as it is the braking period, the motor generator 10 may be constantly cooled. Alternatively, even during the braking period, if the quantity of electricity Qb of the battery 20 is less than the predetermined quantity of electricity Qa, the first thermoelectric conversion element 11 may convert the thermal energy of the motor generator 10 into electric power and recover the electric power, to thereby charge the battery 20. In this case, due to the electric power recovered by the first thermoelectric conversion element 11, the battery 20 can be more quickly charged. As stated above, the propulsion device 1b may be so configured as to make a judgment of conditions for operating the first thermoelectric conversion element to cool the motor generator in the braking period.

As explained above, the propulsion device 1b of the present embodiment not only cools the motor generator 10 during braking but also converts the thermal energy generated by the motor generator 10 into electric power. The propulsion device 1b enhances the energy-use efficiency more than the propulsion device 1a, and thus reduces the cost required for securing energy. For that reason, when the vehicle is a hybrid vehicle having an internal combustion engine, not shown, as another power source, fuel consumption is improved. Furthermore, a temperature rise of the motor generator 10 is restrained by converting the thermal energy generated by the motor generator 10 into electric power, so that the power loss (copper and iron losses) of the motor generator 10 is further reduced, and the durability of the motor generator 10 is further enhanced.

Figure 6:
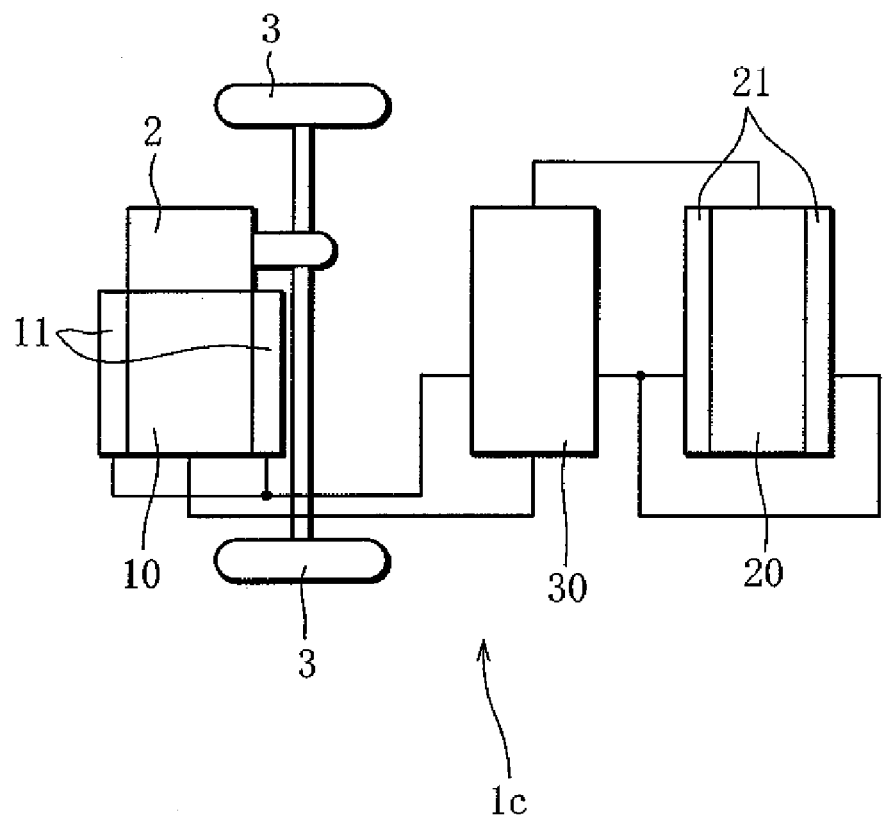
FIG. 6 is a schematic configuration view showing a propulsion device according to a third embodiment of the present invention.
Figure 7:
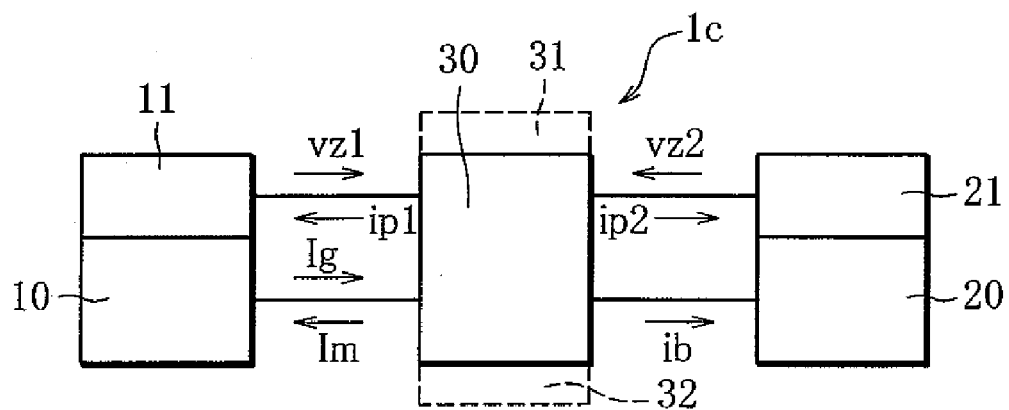
FIG. 7 is a block diagram for explaining the operation of the propulsion device shown in FIG. 6.
Figure 8:
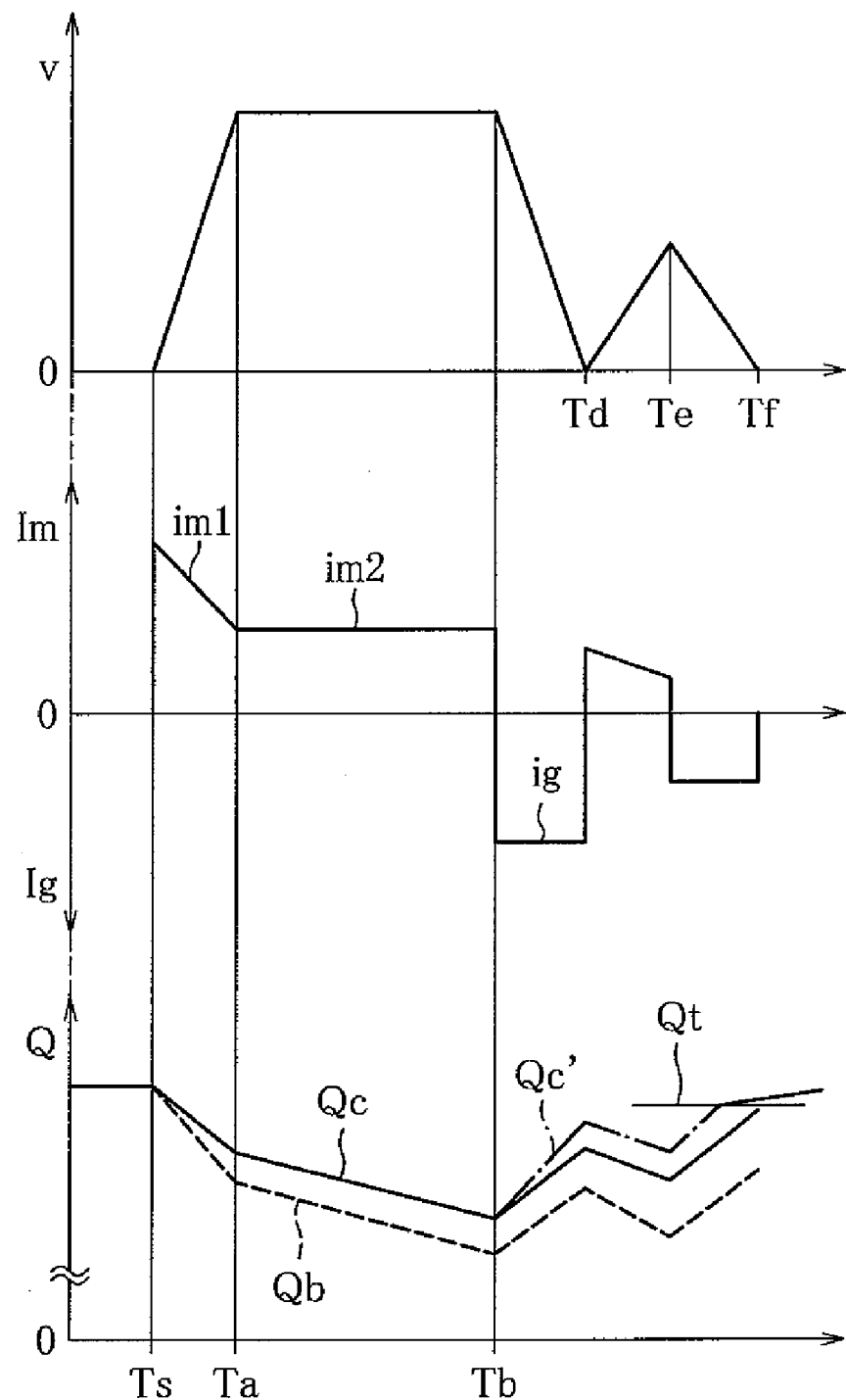
FIG. 8 is a graph showing temporal changes in vehicle speed, motor generator current, and quantity of electricity stored in a battery, when the propulsion device shown in FIG. 6 is in operation.

A vehicle propulsion device 1c of a third embodiment of the invention will be described below with reference to FIGS. 6 to 8. Components having the same functions as those of the first and second embodiments will be provided with the same reference marks, and the explanation thereof will be omitted. FIG. 6 is a schematic configuration view showing the propulsion device 1c. FIG. 7 is a block diagram for explaining the operation of the propulsion device 1c. FIG. 8 is a graph showing temporal changes in vehicle speed v, electric current of a motor generator 10, and quantity of electricity Q stored in a battery 20, when the propulsion device 1c is in operation.

The temporal change of the quantity of electricity Q in FIG. 8 is shown in comparison with that of the second embodiment. In FIGS. 7 and 8, the electric current of the motor generator 10 is denoted by motor drive current Im in a plus region and by regenerated current Ig in a minus region. FIG. 7 shows current supply directions indicated by arrows. In FIG. 8, the electric current that flows out of a PCU 30 is positive current, whereas the electric current that flows into the PCU 30 is negative current.

As illustrated in FIG. 6, the propulsion device 1c of the third embodiment is different from the propulsion device 1b of the second embodiment in that the propulsion device 1c has a second thermoelectric conversion element 21 that is thermally connected with the battery 20 and functions as a thermoelectric generation element due to Seebeck effect. The propulsion device 1c is capable of recovering a portion of thermal energy generated by the charge/discharge of the battery 20 by using the second thermoelectric conversion element 21 controlled by the PCU 30. The PCU 30 has a voltage converter (not shown) that converts output voltage (shown by vz2 in FIG. 7) of the second thermoelectric conversion element 21 into predetermined voltage.

FIG. 8 shows the temporal changes in the motor generator 10 and the quantity of electricity Q stored in the battery 20 when the vehicle is operated in the same manner as in FIG. 5, as shown by the vehicle speed v. However, as to the quantity of electricity Q of the battery 20 shown in FIG. 8, the scale of a vertical axis is enlarged, as compared to FIG. 5.

In the propulsion device 1c, the second thermoelectric conversion element 21 controlled by the PCU 30 converts a portion of the thermal energy generated by the discharge of the battery 20 at the time of driving the vehicle into electric power, and supplies the electric power to the motor generator 10. During braking, the second thermoelectric conversion element 21 converts a portion of the thermal energy generated by the charge of the battery 20 into electric power and the battery 20 is charged by being supplied with the electric power. In other words, in the propulsion device 1c, the discharge rate of the battery 20 is lower than in the propulsion device 1b, and thereby the energy-use efficiency is improved. Consequently, the cost required for securing energy is reduced, and the battery 20 is more quickly charged than in the propulsion device 1b.

More specifically, like the second embodiment, when the vehicle is operated as shown by the vehicle speed v in FIG. 8, the motor drive current Im and the regenerated current Ig in the propulsion device 1c are the same as those in the propulsion device 1b. For that reason, along with the charge of the battery 20 by using the second thermoelectric conversion element 21, quantity of electricity Qc (solid line) of the battery 20 in the propulsion device 1c is increased more than the quantity of electricity Qb (broken line) of the battery 20 in the propulsion device 1b. A temperature rise in the battery 20 naturally drops down, so that the durability of the battery 20 is more improved in the propulsion device 1c than in the propulsion device 1b.

The PCU 30 of the propulsion device 1c may further have a storage rate sensor 31. In this case, during braking, if the quantity of electricity Q of the battery 20, which has been detected by the storage rate sensor 31, is less than predetermined quantity of electricity Qt, the PCU 30 increases a charging current of the battery 20 by suspending the supply of electric current ip1 to the first thermoelectric conversion element 11, and quickly charges the battery 20 as shown by a dashed line Qc' in FIG. 8. When the quantity of electricity Q of the battery 20 reaches the predetermined quantity of electricity Qt, the PCU 30 reduces the charging current of the battery 20 by supplying the electric current ip1 to the first thermoelectric conversion element 11, so that the battery 20 is charged slowly and thereby the possibility of overcharge of the battery 20 can be lowered.

If the PCU 30 of the propulsion device 1c further has a battery temperature sensor 32 that detects the temperature of the battery 20, it is possible to detect a temperature rise in the battery 20, which leads to an increase in internal electrode resistance of the battery 20 (that is, an increase in power loss during charge/discharge). When detecting such a temperature rise, the PCU 30 operates the second thermoelectric conversion element 21 as a Peltier element to cool the battery 20, and reduces the power loss that occurs during the charge/discharge of the battery 20.

More specifically, at the time of braking the vehicle, if the battery 20 has a temperature higher than predetermined temperature (for example, approximately 35 to 40° C.), the PCU 30 supplies the second thermoelectric conversion element 21 with electric current ip2 and operates the second thermoelectric conversion element 21 as a Peltier element. By so doing, the battery 20 is cooled and the charging current of the battery 20 is reduced (for example, current ib=ig−ip1−ip2), so that the possibility of overcharge can be further lowered. The propulsion device 1c is capable of further improving the energy-use efficiency by reducing the power loss of the battery 20, and further lowering the possibility of overcharge.

The battery 20 generates electric power in a chemical reaction, so that a discharge capacity is deteriorated if the battery 20 is overly cooled. In general, a battery tends to be deteriorated in discharge capacity at temperature lower than normal temperature. It is then preferable to stop the cooling of the battery 20, which is carried out by the second thermoelectric conversion element 21, if the temperature of the battery 20 drops down to, for example, about 20° C.

The propulsion device of the present invention is not limited to the above-described embodiments, and may be properly modified without deviating from the scope and spirit of the invention. For example, the present invention may be applied to a so-called hybrid car using not only a motor generator but also an internal combustion engine, such as a gasoline engine or a diesel engine, as a power source.

Furthermore, the vehicle, to which the propulsion device of the present invention is applied, is not limited to a so-called automobile. The propulsion device of the present invention may be applied to various vehicles including motorbikes, vehicles that travel on the track, etc.

The invention claimed is:

1. A vehicle propulsion device comprising:
   a motor generator installed in a vehicle and configured to drive a drive wheel of the vehicle by operating as a motor and braking the drive wheel of the vehicle by operating as a generator;
   a storage battery that transfers electric power to and from the motor generator;
   a first thermoelectric conversion element thermally connected to the motor generator and configured to absorb heat from the motor generator when the electric power is supplied to the first thermoelectric conversion element; and
   a power control unit that controls the power transfer between the motor generator and the storage battery so that the electric power is supplied from the storage battery to the motor generator when the motor generator drives the drive wheel, that controls the power transfer between the motor generator and the storage battery so that the electric power is supplied from the motor generator to the storage battery, and that simultaneously controls a power supply from the motor generator to the first thermoelectric conversion element so that the first thermoelectric conversion element is supplied with the electric power from the motor generator to cool the motor generator, when the motor generator brakes the drive wheel.

2. The vehicle propulsion device according to claim 1, wherein the power control unit implements such control so that the first thermoelectric conversion element converts thermal energy generated by the motor generator into the electric power and supplies the electric power to one of the storage battery and the motor generator when the first thermoelectric conversion element is not cooling the motor generator.

3. The vehicle propulsion device according to claim 1, further comprising:
   a second thermoelectric conversion element thermally connected to the storage battery;
   wherein, when the motor generator drives the drive wheel, the power control unit implements such control so that the second thermoelectric conversion element converts thermal energy of the storage battery into the electric power and supplies the electric power to the motor generator, and when the motor generator brakes the drive wheel, the power control unit implements such control so that the second thermoelectric conversion element converts the thermal energy of the storage battery into the electric power and charges the storage battery.

4. The vehicle propulsion device according to claim 1, further comprising:
   a storage rate sensor that detects a quantity of electricity stored in the storage battery;
   wherein, when the motor generator brakes the drive wheel, and the electric power is supplied from the motor generator to the storage battery, the power control unit implements such control so that the power supplied from the motor generator to the first thermoelectric conversion element is stopped if the quantity of electricity, which has been detected by the storage rate sensor, is less than a predetermined quantity of electricity, and so that the first thermoelectric conversion element is supplied with the electric power from the motor generator to cool the motor generator if the quantity of electricity, which has been detected by the storage rate sensor, is equal to or more than the predetermined quantity of electricity.

5. The vehicle propulsion device according to claim 4, wherein, when the motor generator brakes the drive wheel, and the electric power is supplied from the motor generator to the storage battery, the power control unit implements such control so that the first thermoelectric conversion element converts thermal energy generated by the motor generator into the electric power to charge the storage battery if the quantity of electricity, which has been detected by the storage rate sensor, is less than the predetermined quantity of electricity.

6. The vehicle propulsion device according to claim 4, wherein the predetermined quantity of electricity is less than a rated storage capacity of the storage battery.

7. The vehicle propulsion device according to claim 3, further comprising:
   a battery temperature sensor that detects a temperature of the storage battery;
   wherein, when the motor generator brakes the drive wheel, and the temperature of the storage battery, which has been detected by the battery temperature sensor, is equal to or higher than a predetermined temperature, the power control unit implements such control so that the second thermoelectric conversion element is supplied with the electric power from the motor generator to cool the storage battery.

* * * * *